United States Patent [19]

Fett et al.

[11] Patent Number: 4,958,726
[45] Date of Patent: Sep. 25, 1990

[54] CURVED APRON CONVEYOR

[75] Inventors: Jürgen Fett, Atzelgift; Karl G. Oelschläger, Hagen; Wolfgang Bannert, Fröndenberg-Dellwig, all of Fed. Rep. of Germany

[73] Assignee: Rexnord Kette GmbH & Co. KG, Fed. Rep. of Germany

[21] Appl. No.: 333,429

[22] Filed: Apr. 4, 1989

[30] Foreign Application Priority Data

May 28, 1988 [DE] Fed. Rep. of Germany ....... 3818231

[51] Int. Cl.⁵ .............................................. B65G 17/06
[52] U.S. Cl. ..................................... 198/852; 198/853
[58] Field of Search ......................... 198/851, 852, 853

[56] References Cited

U.S. PATENT DOCUMENTS

| 2,884,118 | 4/1959  | Williams        | 198/852   |
|-----------|---------|-----------------|-----------|
| 3,262,550 | 7/1966  | Kampfer         | 198/852 X |
| 3,512,627 | 5/1970  | Hodlewsky et al.| 198/852 X |
| 3,513,964 | 5/1970  | Imse            | 198/852   |
| 3,520,398 | 7/1970  | Thomson         | 198/852   |
| 3,773,349 | 12/1973 | Kampfer         | 198/852   |
| 3,868,011 | 2/1975  | Janzen et al.   | 198/853   |
| 4,682,687 | 7/1987  | Leege et al.    | 198/852   |
| 4,809,846 | 3/1989  | Hodlewsky et al.| 198/853   |

FOREIGN PATENT DOCUMENTS

| 2264865 | 5/1975 | Fed. Rep. of Germany | 198/852 |
| 3046568 | 7/1982 | Fed. Rep. of Germany | 198/853 |
| 1501619 | 2/1978 | United Kingdom       | 198/853 |

Primary Examiner—H. Grant Skaggs
Assistant Examiner—James R. Bidwell
Attorney, Agent, or Firm—Toren, McGeady & Associates

[57] ABSTRACT

The stability and robustness of a curved apron conveyor comprising a plurality of plate members, engaging with one another at their adjacent side edges with hinge eyes, connected to one another by way of hinge pins and having guiding surfaces cooperating with stationary guide rails, is improved by arranging the guiding surfaces off-center of the plate members in relation to the conveying direction.

9 Claims, 4 Drawing Sheets

CURVED APRON CONVEYOR

TECHNICAL FIELD OF THE INVENTION

The invention relates to a curved apron conveyor having a plurality of plate members engaging with one another at their neighbouring side edges with hinge eyes, connected to one another by hinge pins and having guiding surfaces cooperating with guide rails.

BACKGROUND OF THE INVENTION AND PRIOR ART

In a curved apron conveyor of this kind known from U.S. Pat. No. 3,513,964 guiding surfaces welded under the individual plate members, extending parallel to the longitudinal axis of the conveyor and connected by means of cross-pieces or ribs, are used to guide the belt conveyor on its curved path. For this purpose the guiding surfaces are inclined and abut against the similarly inclined, stationary guide rails of the apron conveyor. The angle of inclination is selected so that the plate members cannot lift off upwards. In the case of right-angled guide rails and guiding surfaces arranged perpendicular to the plate plane it is known to prevent the apron conveyor from lifting off by means of guide tongues on the guiding surfaces, bent outwardly at right angles, that engage under the rails.

Furthermore, it is known from German Auslegeschrift No. 22 37 600 to make the guiding surfaces of a plate member serving for guidance on stationary slide bars or rails from guiding surfaces bent downwards substantially perpendicular to the plate member. The plate member and the guiding surfaces comprise an integral sheet metal blank and the bent edges of the guiding surfaces lie within the area of the plate member. The known apron conveyors, however have the disadvantage that goods being conveyed that are liable to break during the operation, such as for example broken glass, can stick between the plate members and cause damage.

OBJECT OF THE INVENTION

It is the object of the invention to provide an apron conveyor of the kind described in the introduction with improved qualities, and in particular to improve the stability and robustness of the plate members and their operating performance.

SUMMARY OF THE INVENTION

To this end, according to the invention, guiding surfaces are provided which are arranged off-center in relation to the conveying direction. The guiding surfaces are arranged in the space defined by the two middle axes extending through the hinge eyes of the opposite side edges of a plate member so that the distance to the front side edge is smaller than that to the rear side edge. There is thus a larger open space or gap between the hinge eye arranged centrally on the rear side edge and the edges of the guiding surfaces facing this side edge. In this way the danger of, for example, broken glass getting caught between the guiding surfaces is reduced, and in addition there is a self-cleaning effect of the apron conveyor since broken pieces of material that may get under the plate members can escape via the large gaps and fall down.

The guiding surfaces preferably have their front edges up against the hinge eyes of the double-hinge-eye side edges of the plate member. In this manner they can advantageously engage in recesses situated on the outer sides of the hinge eyes facing the guide rails. Guiding surfaces which are thus arranged off-center so that their front edges fit up against the hinge eyes or in recesses therein can therefore be supported on the hinge eyes. In this way additional stability is obtained and the danger of the guiding surfaces deforming owing to external influences can be reduced. The "double-hinge-eye" side edge in this case means the side edge of the plate member on which the so-called outer hinge eyes are located between which the hinge eyes of the adjacent side edges engage; there can be more than two hinge eyes on the double-hinge-eye side edge.

The guiding surfaces can be formed directly from the plate member, i.e. by bending down a one-piece sheet metal blank in an off-center position; but advantageously they can be welded on to the plate member, preferably being welded off-center on to a connecting cross-piece or rib. In this way the plate members can easily be provided with prefabricated guide shoes which comprise the connecting rib and the guiding surfaces already welded off-center thereto.

The off-center arrangement of the guiding surfaces on the connecting rib enables the welding spots of the connecting rib and of the guiding surfaces to be offset from one another, i.e. the welding spots fastening the connecting rib and the guiding surfaces to the plate member do not need to lie on a straight connecting line. This enables warping of the plate member when welding the guiding surfaces thereto to be avoided and a flat conveying or carrying surface to be obtained. Furthermore, owing to the offset welding spots the guiding means has a higher shear strength.

Alternatively the connecting rib can be provided with at least one notch between two welding spots. In this case the notch extending transversely over the rib compensates for warping when the plate member cools.

BRIEF DESCRIPTION OF THE DRAWINGS

The invention will now be explained in more detail with reference to exemplary embodiments shown in the drawings, in which.

DETAILED DESCRIPTION OF PREFERRED EMBODIMENTS OF THE INVENTION

Figure 11:
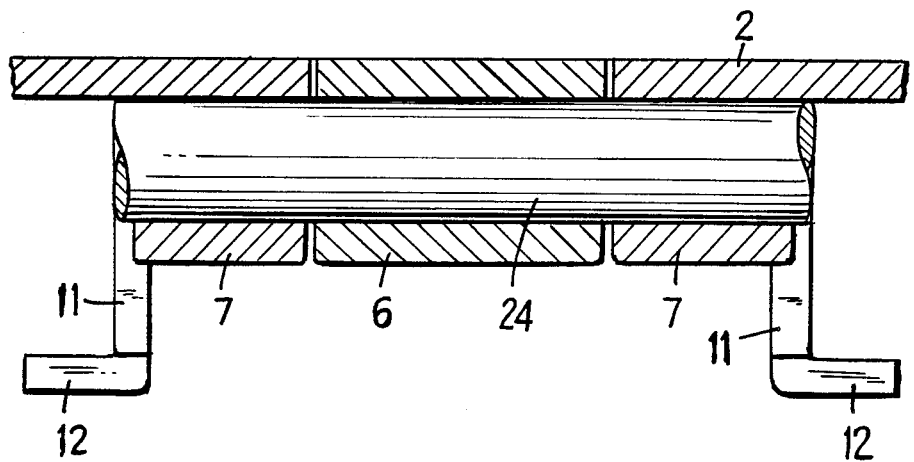
FIG. 11 is an enlarged sectional view taken along line XI—XI in FIG. 2.

A curved apron conveyor 1 is often used to convey bottles and containers of different types in industrial plants and to handle foodstuffs and liquids in packaging plants. The apron conveyor 1 comprises plate members 2 arranged one behind the other which form a flat carrying surface 3 (see FIGS. 2 and 5) for the goods to be conveyed. The plate members 2 comprise a flat middle part whose one (rear) side edge 4 has a central hinge eye 6 and whose opposed (front) side edge 5 (double-hinge-eye side edge) has two hinge eyes 7 spaced apart from one another. The central hinge eye 6 engages into the space between the hinge eyes 7 of the neighbouring plate member and is rotatably connected thereto by a hinge pin (not shown in FIG. 1). The hinge pin 24 is shown in FIG. 11. The central hinge eyes 6 are formed so that they allow lateral tilting of the individual plate members 2.

Figure 3:
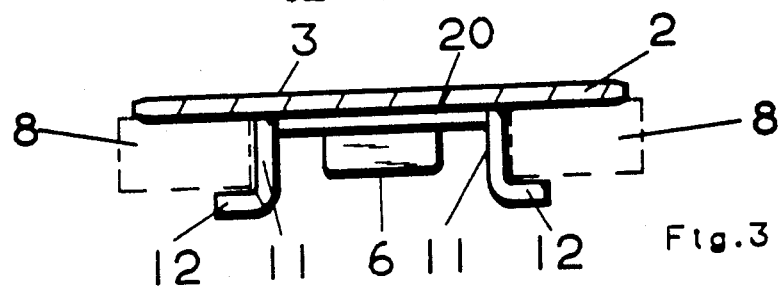
FIG. 3 shows a section along the line III—III in FIG. 1 of plate members folded into the drawing plane.
Figure 6:
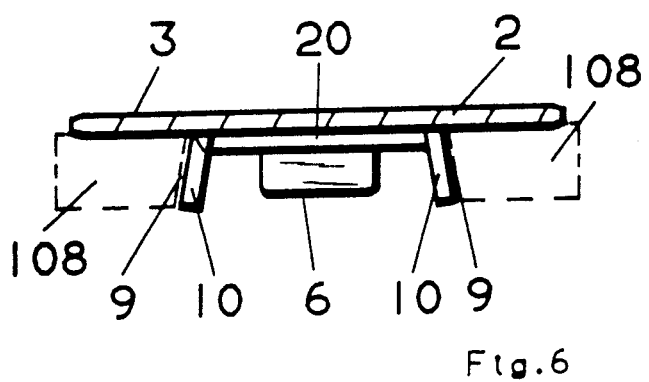
FIG. 6 shows a section along the line VI—VI in FIG. 4 of a plate member folded into the drawing plane.

With such curved apron conveyors 1 the jointed belt is guided in a stationary carriage comprising two guide rails 8 (FIG. 3) and 108 (FIG. 6) opposite one another. While the rails 8 are rectangular the guide rails 108 each have inclined inner surfaces 9 which cooperate with corresponding, similarly inclined guiding surfaces 10 of the plate member 2 (see FIG. 6) and hold the jointed belt in a horizontal plane, and guide it round curves. In the embodiment shown in FIG. 3 having plate members 2 guided in right-angled rails 8 each plate member has guiding surfaces 11 extending substantially vertically downwards having guide tongues 12 bent outwardly at right angles to engage under the guide rails 8 for lateral and horizontal guidance on the guide rails 8.

Figure 2:
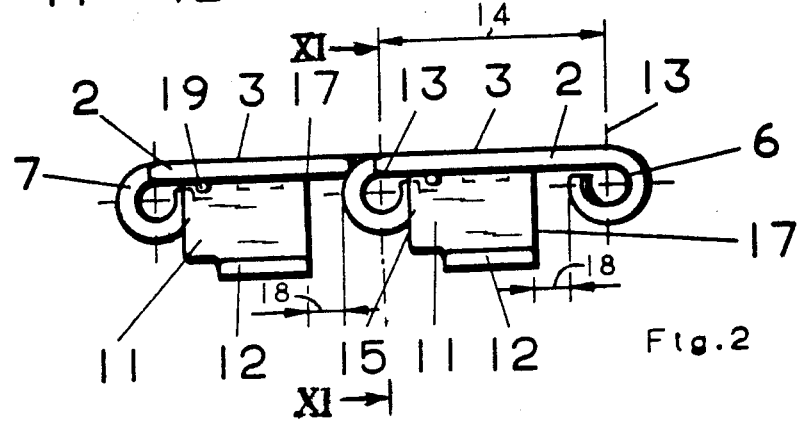
FIG. 2 shows plate members as shown in FIG. 1 in side elevation folded into the drawing plane.
Figure 5:
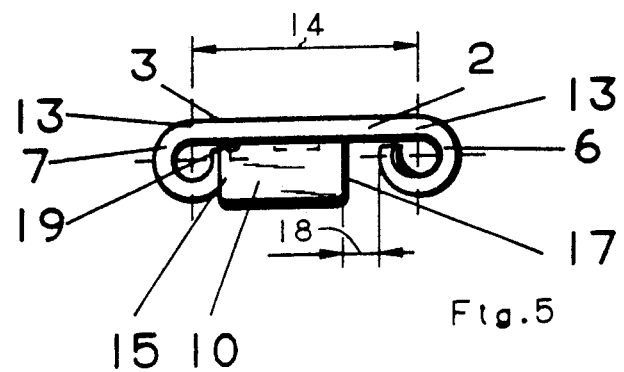
FIG. 5 shows in side elevation the plate member shown in FIG. 4 folded into the drawing plane.
Figure 9:
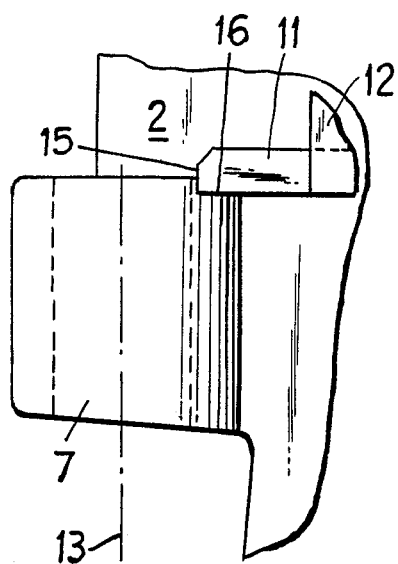
FIG. 9 and 10 are detail views of the encircled portion designated FIG. 9 in FIG. 1.
Figure 10:
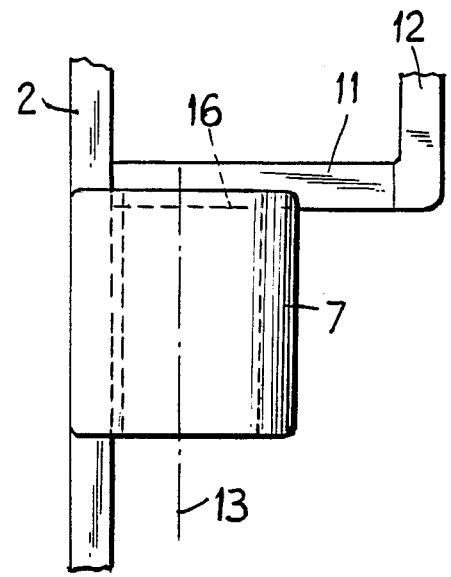

The guiding surfaces 10 and 11 are arranged off-center of the plate members in the conveying direction, i.e. off-center in the space 14 defined by the two centre axes 13 extending through the hinge eyes 6, 7 of the opposed side edges 4, 5 of a plate member 2. The off-center arrangement is such that the front edges 15 of the guiding surfaces, facing the front side edge 5 of the plate member 2, engage in the recesses 16 on the outside of the hinge eyes 7 and are supported there, note the detail showing in FIGS. 9 and 10. In comparison the opposite edges 17 of the guiding surfaces 10, 11 facing the rear side edge 4 of the plate member terminate some distance from the central hinge eyes 6 and a large space 18 results between the edges 17 and the outer surface of the hinge eye 6, which is rolled inwardly, as shown in FIG. 2 and FIG. 5.

If the guiding surfaces 10, 11 are not made directly from a plate integral with the plate member 2, but—as shown—are spot-welded by means of welding spots 19 under the plate member 2 and are connected to one another by a connecting rib 20, the plate members 2 can be provided with prefabricated, C-shaped guiding shoes. The guiding shoes thus each comprise two guiding surfaces 10 and 11 connected to one another by a connecting rib 20 that can be welded by at least one welding spot 21 on to the underside of the plate member, the guiding surfaces 10, 11 being already welded off-center to the connecting rib 20.

Figure 1:
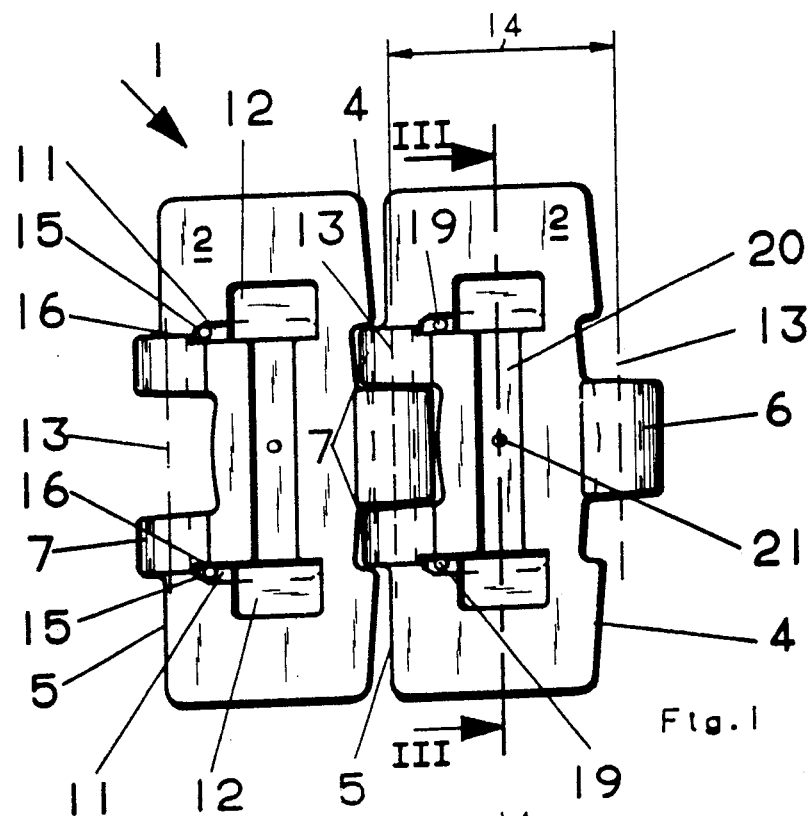
FIG. 1 shows a view from below of two plate members connected to one another having guiding surfaces arranged off-center according to the invention.
Figure 4:
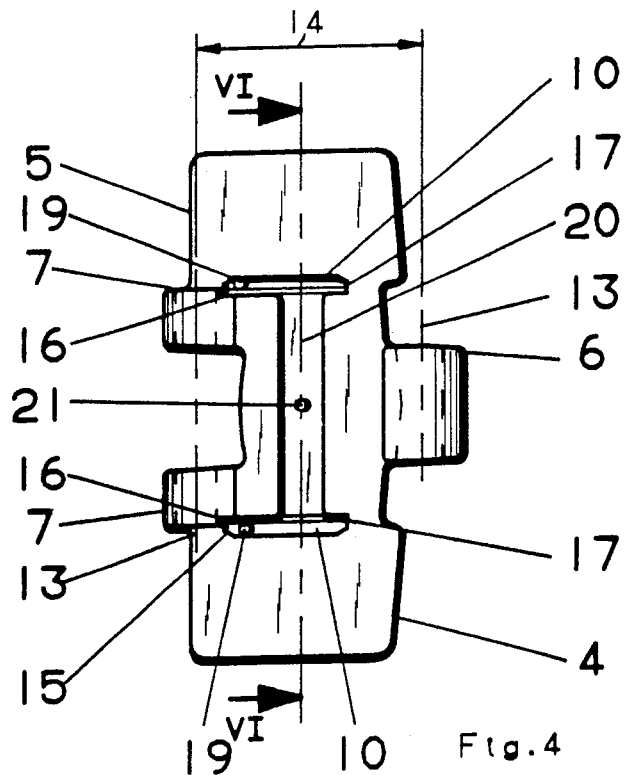
FIG. 4 shows a view from below of a plate member having guiding surfaces arranged off-center according to the invention, in which the guiding surfaces, unlike the embodiment shown in FIGS. 1 to 3, are inclined outwardly.
Figure 7:
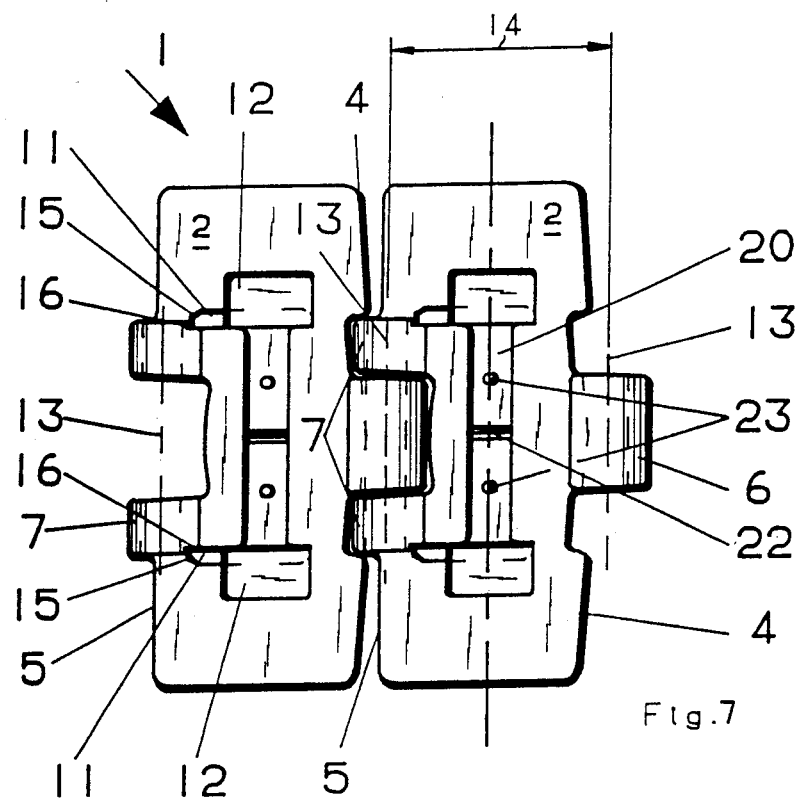
FIG. 7 shows a view corresponding to FIG. 1 of a plate member which is provided with a notch between two welding spots on the connecting rib.
Figure 8:
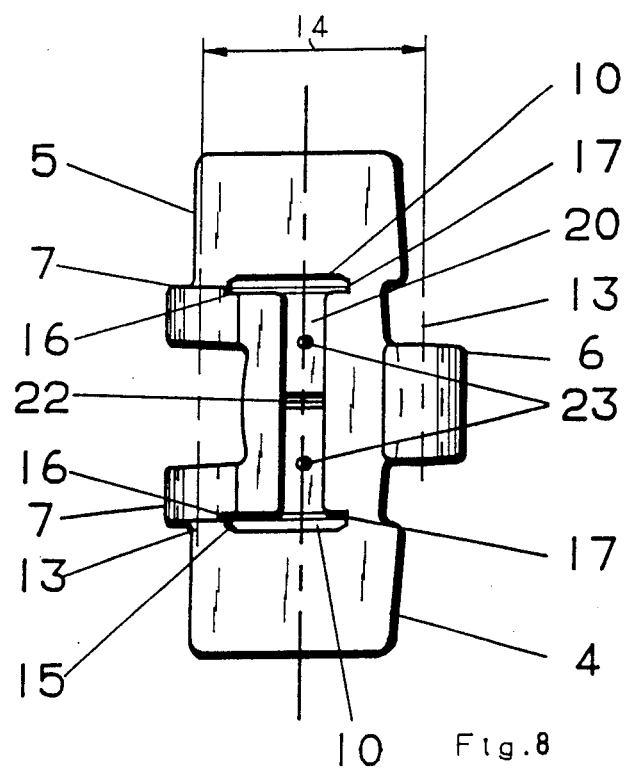
FIG. 8 shows a view corresponding to FIG. 4 of a plate member which is provided with a notch between two welding spots on the connecting rib.

The welding spots 19, 21 securing the connecting rib 20 and the guiding surfaces 10 and 11 to the plate member 2 are arranged offset to one another in the case of the plate members 2 shown in FIGS. 1 and 4, i.e. they do not run in a line or in alignment. Thus the welding spots 19 securing the guiding surfaces 10, 11 to the plate member 2 are located in the region of the front edges 15 spaced further away from the connecting rib 20, while the welding spot 21 is arranged substantially in the middle of the connecting rib 20. When the connecting rib 20 with the guiding surfaces 10 and 11 is welded to the plate member 2 warping of the carrying surface 3 is prevented because of the offset welding spots 19, 21. In the exemplary embodiment shown in FIGS. 7 and 8 the connecting ribs 20 of the C-shaped guiding shoes are securely welded to the plate member 2 with two welding spots 23. Between the two welding spots the rib 20 is provided with a transverse notch 22 which compensates for possible distortion of the weld on cooling.

What is claimed is:

1. A curved apron conveyor comprising a plurality of plate members, engaging with one another at their neighbouring side edges with hinge eyes, connected to one another by means of hinge pins and having guiding surfaces that cooperate with guide rails, wherein said guiding surfaces that cooperate with guide rails, wherein said guiding surfaces are arranged off-center of said plate members in relation to the conveying direction, said guiding surfaces each having a front edge and a rear edge, said hinge eyes comprising a double front hinge eye and a single rear hinge eye, said front edge contacting said double front hinge eye so as to provide additional lateral stability of the guiding surface relative to the front hinge eye, and said rear edge, spaced from said rear hinge eye, forming an open space therebetween so that said conveyor has a self-cleaning effect.

2. An apron conveyor according to claim 1 wherein said guiding surfaces are welded on to said plate members.

3. An apron conveyor according to claim 1 wherein said guiding surfaces are welded off-center to a connecting rib.

4. An apron conveyor according to claim 3 wherein said connecting ribs are spot-welded to respective plate members and the welding spots of the connecting rib and the guiding surfaces are offset from one another on the plate member.

5. An apron conveyor according to claim 1 wherein said guiding surfaces are inclined and said guide rails have inclined surfaces.

6. An apron conveyor according to claim 1 wherein said guiding surfaces are arranged at right-angles to the plane of said plate members and have right-angled, outwardly angled guide tongues that engage under rectangular guide rails.

7. A curved apron conveyor comprising a plurality of plate members, engaging with one another at their neighbouring side edges with hinge eyes, connected to one another by means of hinge pins and having guiding surfaces that cooperate with guide rails, wherein said guiding surfaces are arranged off-center of said plate members in relation to the conveying direction, wherein front edges of said guiding surfaces engage in recesses in said hinge eyes.

8. An apron conveyor according to claim 7 wherein said hinge eyes are provided with recesses in their outer sides facing said guide rails.

9. A curved apron conveyor comprising a plurality of plate members, engaging with one another at their neighbouring side edges with hinge eyes, connected to one another by means of hinge pins and having guiding surfaces that cooperate with guide rails, wherein said guiding surfaces are arranged off-center of said plate members in relation to the conveying direction, said guiding surfaces are welded off-center to a connecting rib, and said connecting rib has at least one notch between the welding spots securing it to said guiding surfaces.

* * * * *